(12) United States Patent
Sakamoto

(10) Patent No.: US 7,375,766 B2
(45) Date of Patent: May 20, 2008

(54) METHOD OF DISPLAYING IMAGE, DEVICE FOR DISPLAYING IMAGE AND PROGRAM

(75) Inventor: Kazuaki Sakamoto, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 503 days.

(21) Appl. No.: 11/044,052

(22) Filed: Jan. 28, 2005

(65) Prior Publication Data

US 2005/0168642 A1    Aug. 4, 2005

(30) Foreign Application Priority Data

Jan. 29, 2004    (JP) .............................. 2004-021390

(51) Int. Cl.
G06F 17/24    (2006.01)

(52) U.S. Cl. ...................... 348/569; 715/264

(58) Field of Classification Search ............. 348/569; 715/536

See application file for complete search history.

(56) References Cited

U.S. PATENT DOCUMENTS

| | | | | |
|---|---|---|---|---|
| 4,203,102 A | * | 5/1980 | Hydes | 345/467 |
| 4,745,560 A | * | 5/1988 | Decker et al. | 358/1.11 |
| 5,131,053 A | * | 7/1992 | Bernzott et al. | 382/176 |
| 5,504,822 A | * | 4/1996 | Holt | 382/218 |
| 5,860,075 A | * | 1/1999 | Hashizume et al. | 715/530 |
| 6,370,269 B1 | * | 4/2002 | Al-Karmi et al. | 382/197 |
| 7,149,347 B1 | * | 12/2006 | Wnek | 382/159 |
| 2004/0001703 A1 | * | 1/2004 | Kang | 386/95 |
| 2004/0039996 A1 | * | 2/2004 | Flam | 715/536 |

FOREIGN PATENT DOCUMENTS

| | | |
|---|---|---|
| JP | 4-261583 | 9/1992 |
| JP | 2563376 | 9/1996 |
| JP | 10-271439 | 10/1998 |
| JP | 2852202 | 11/1998 |
| JP | 11-52937 | 2/1999 |
| JP | 2000-20047 | 1/2000 |
| JP | 2000-206955 | 7/2000 |
| JP | 2000-250515 | 9/2000 |

\* cited by examiner

*Primary Examiner*—Doug Hutton
*Assistant Examiner*—Daeho D Song
(74) *Attorney, Agent, or Firm*—Young & Thompson

(57) ABSTRACT

The device for displaying an image of the present invention is configured such as to have font data including the left-to-right reversion of the characters of the language written from right to left and also a reversion selection register in the OSD control section, wherein OSD picture data in the memory section are left-to-right reversed and transferred to VRAM when a language to be written from right to left is selected as a display language.

8 Claims, 8 Drawing Sheets

ISO8859-1

Font1 Font2 Font3 Font4 Font5

Japanese

Font1 Font2 Font3 Font4 Font5

Arabic

Font1 Font2 Font3 Font4 Font5 Font6

Arabic left-to-right reversed

Font1 Font2 Font3 Font4 Font5 Font6

METHOD OF DISPLAYING IMAGE, DEVICE FOR DISPLAYING IMAGE AND PROGRAM

BACKGROUND OF THE INVENTION

1. Field of the Invention

The present invention relates to a method of displaying an image, a device for displaying an image and a program.

2. Description of the Related Art

Recently, image display devices have come to have complicated setup menus due to high performance functionality. The world-wide market for image display devices which have setup menus which allow a choice of a language are increasing.

The configuration of a conventional image display device capable of performing resolution conversion and OSD (On Screen Display) video synthesis processing function has, as represented in FIG. 1, scaler section 100, A/D converter 101, video decoder 102, CPU 112, RAM for work area 113, ROM for storing program codes and setup data 114, ROM for storing OSD-related data 115 and bus line 116.

Scaler section 100 has input section 103 that selects a video signal of A/D converter 101 and video decoder 102, memory section 104 that stores the video signal selected at input section 103, resolution converter 105 that converts the resolution of the video signal stored in memory section 104, VRAM 106 for deploying the resolution-converted video signals, OSD control section 107 that controls the on-screen display of the OSD pictures, memory section 108 that serves as a work area for producing the OSD pictures, output section 109 that supplies video signals stored in VRAM 106, internal bus line 111 that connects the blocks within scaler 100, and interface section 110 that controls the communication between bus line 116 and internal bus line 116. VRAM 106 is provided with video storage section 106a, which stores video signals, and OSD picture storage section 106b, which stores OSD pictures. OSD control section 107 is provided with H/V address setup section 107a, which sets up the addresses in OSD picture storage section 106b.

In conventional image display devices capable of displaying a setup menu in a language selected from a plurality of languages, since many languages such as English, German and Japanese are written from left to right, the display layout of the setup menu is designed to be properly formatted when written in a language that is written from left to right. For example, setup item names are arranged on the left side of a screen and setup values and adjustment bars are represented on the right side of the item names, in a flush left representation (cf. JP 2000-206955).

In the above described on-screen layout, a problem has been encountered, however, that displaying a language to be written from right to left such as Arabic yields a representation that appears to be unbalanced and very clumsy, because the right-side display positions of the characters at the top of letter strings are not aligned.

In order to address this issue, while an invention has been described (cf. JP Patent No. 2563376) in which a language information processor section corresponding to a selected language executes any of flush left/right, left/right margin, right/left justification, indent, equal space and frame space procedures, and in the case where the selected language is Arabic, performs processing identical to that of English regarding flush left and left margin, nothing is specifically described regarding the way to write a right-to-left language (a language to be written from right to left) such as Arabic.

An invention of a method and apparatus for displaying bi-directional text has been described (cf. JP 2000-250515) in which an on-screen control function is provided, the function supporting a default language that is written in a first direction from left to right and a non-default language that is written in a second direction from right to left such as Arabic and Hebrew; reversing the order of characters in the portion of the non-default language in the text to be displayed on the screen; and creating a line break at a space between the characters in the line which is the closest to the end of the line, and displaying the space at the left end of the text window.

In conventional image display devices, since many languages such as English, German and Japanese are written from left to right, the display layout of the setup menu is designed to be properly formatted when written in a left-to-right language. For example, setup item names are arranged on the left side of a screen and setup values and adjustment bars are represented on the right side of the item names, in a flush left representation.

On the other hand, when a setup menu is displayed in a language written from right to left such as Arabic and Hebrew, it is preferred that setup item names are arranged on the right side of a screen, and setup values and adjustment bars are represented on the left side of the item names, in a flush right representation. In the invention described in JP 2000-250515, while the left-to-right written language can be converted into the right-to-left written language by reversing the order of characters, it is impossible to make the conversion from the writing style of setup item names arranged on the left side of a screen and setup values and adjustment bars arranged on the right side of the item names to the writing style of setup item names arranged on the right side of a screen and setup values and adjustment bars arranged on the left side of the item names. In order to convert the display order from the arrangement that setup item names are arranged on the left side of a screen and setup values and adjustment bars are displayed on the right side thereof to the arrangement that setup item names are arranged on the right side of a screen and setup values and adjustment bars are displayed on the left side thereof, it is necessary to provide new on-screen layout data for arranging setup item names on the right side of a screen and displaying setup values and adjustment bars on the left side thereof. This gives rise to the problem for increased ROM capacity.

SUMMARY OF THE INVENTION

In view of the above-described problem, it is an object of the present invention to provide a method of displaying an image, a device for displaying an image and a program capable of displaying a setup menu in a proper format even when a language to be written from right to left is selected.

The method of displaying an image according to the present invention comprises the steps of: storing a font of a language written from left to right in ROM for storing the OSD-related data in an ordinary style in which the font is not reversed left to right, and storing a font of a language written from right to left in ROM for storing the OSD-related data in a style in which each font is reversed left to right; reading menu data, which is component data of the setup menu to be displayed on a screen from ROM for storing the OSD-related data and deploying the read data on RAM for a work area; reading frame data and icon data from ROM for storing the OSD-related data according to the menu data deployed in RAM for a work area, and deploying the read data in a memory section as OSD picture data; acquiring a selection language, which is a language to be displayed; reading text data of the acquired selection language from ROM for storing the OSD-related data, selecting the font to be used from the text data, reading word data and font data from ROM for storing the OSD-related data and deploying the read data in the memory section as the OSD picture data; deciding whether or not the selection language is a language to be written from right to left, if the selection language is a language to be written from right to left, then setting up the information indicating reversion in a reversion selection register, and if the selection language is a language to be written from left to right, then setting up the information indicating no reversion in a reversion selection register; and If the setup value of the reversion selection register is the information indicating reversion, then reversing the OSD picture stored in the memory section left to right and transferring the reversed picture to VRAM.

Further, the step of reversing left to right the OSD picture and transferring the reversed picture to VRAM comprises the steps of: setting up a vertical start address in the OSD picture storage section, to which OSD picture data stored in the memory section are transferred, under the control of the OSD control section; selecting whether to reverse left to right in accordance with the setup value of the reversion selection register by operation of the OSD control section; setting up a horizontal start address in the OSD picture storage section based on the setup value of the reversion selection register; transferring one pixel of the OSD picture data stored in the memory section into the address of the OSD picture storage section; incrementing or decrementing the horizontal address of the OSD picture storage section by 1 based on the setup value of the reversion selection register; and confirming whether or not the horizontal address of the OSD picture storage section is outside the OSD region and deciding whether or not the transfer of one line of data has ended; and if the transfer of one line of data has not ended, the process returns to the step of the transferring one pixel of the OSD picture data and repeats the subsequent steps until the transfer of one line of data ends, and if the transfer of one line of data has ended, the process executes the steps of: incrementing the vertical address in the OSD picture storage section by 1; and confirming whether or not the vertical address in the OSD picture storage section is outside the OSD region and deciding whether or not the transfer of all the lines of data has ended; and if the transfer of all the lines of data has not ended, the process returns to the step of selecting whether to reverse left to right and repeats the subsequent steps until the transfer of all the lines of data ends.

The program according to the present invention enables a computer or a microprocessor to execute the method of displaying an image described above.

The device for displaying an image according to the present invention comprises: a means for reading menu data, which is component data of a setup menu to be displayed on a screen from ROM for storing the OSD-related data and deploying the read data in RAM for a work area; a means for reading frame data and icon data from ROM for storing the OSD-related data according to the menu data deployed in RAM for a work area, and deploying the read data in a memory section as OSD picture data; a means for acquiring a selection language, which is a language selected to be displayed; and a means for reading text data of the acquired selection language from ROM for storing the OSD-related data, selecting the font to be used from the text data, reading word data and font data from ROM for storing the OSD-related data, and deploying the read word and font data in the memory section as the OSD picture data, wherein the font has an ordinary form that is not left-to-right reversed for a font whose characteristic is that it is to be written from left to right, and has a form that is created by left-to-right reversal of the ordinary font for the font whose characteristic is that it is to be written from right to left; a means for deciding whether or not the selection language is a language to be written from right to left; a means for setting up the information indicating reversion in a reversion selection register for selecting whether to reverse an OSD picture left to right if the selection language is a language to be written from right to left, and setting up the information indicating no reversion in a reversion selection register if the selection language is a language to be written from left to right; and a means for reversing left to right the OSD picture stored in the memory section and transferring the reversed picture to VRAM If the setup value of the reversion selection register represents the information indicating reversion.

Further, the means for reversing the OSD picture left to right and transferring the reversed picture to VRAM comprises: a means for setting up a vertical start address in the OSD picture storage section, to which an OSD picture data stored in the memory section is transferred under the control of the OSD control section; a means for selecting whether to reverse left to right in accordance with the setup value of the reversion selection register by the operation of the OSD control section; a means for setting up a horizontal start address in the OSD picture storage section based on the setup value of the reversion selection register; a means for transferring one pixel of the OSD picture data stored in the memory section into the address of the OSD picture storage section; a means for setting the horizontal address of the OSD picture storage section an incremented or decremented value by 1 based on the setup value of the reversion selection register; a means for confirming whether or not the horizontal address of the OSD picture storage section is outside the OSD region and deciding whether or not the transfer of one line of data has ended; a means for repeatedly operating a means for transferring one pixel of the OSD picture data, a means for setting an incremented or decremented value by 1 and a means for deciding whether or not the transfer of one line of data has ended until the transfer of one line of data ends, if the transfer of one line of data has not ended; a means for setting the vertical address of the OSD picture storage section an incremented value by 1 if the transfer of one line of data has ended; a means for confirming whether or not the vertical address in the OSD picture storage section is outside the OSD region and deciding whether or not the transfer of all the lines of data has ended; and a means for repeatedly operating all of the above-described means except the means for setting up a vertical start address until the transfer of all the lines of data ends, if the transfer of all the lines of data has not ended.

The program according to the present invention enables a computer or a microprocessor to function as a device for displaying an image as described above.

The present invention offers advantages as described bellow.

A first advantage is that it provides an on-screen display that has an on-screen layout with a desirable appearance as a setup menu of the language that is to be written from right to left. The reason for this is that displaying a right-to-left written language involves left-to-right reversion with the name of a setup item laid on the right side of the screen and a setup value and an adjustment bar displayed on the left side thereof, a text portion being displayed flush right.

A second advantage of the present invention is that the left-to-right reversion that is to be made when displaying a right-to-left written language does not entail left-to-right reversion in a text display (display of characteristics in a text). The reason for this is that the font data of the right-to-left written language are prepared in advance in a left-to-right reversed script.

A third advantage of the present invention is that both the right-to-left and left-to-right written languages can be displayed without increasing the capacity of ROM. The reason for this is that data on the on-screen layout is common to the right-to-left and left-to-right written languages.

A fourth advantage of the present invention is that the switching processing can easily be bi-directionally effected between the right-to-left and left-to-right written languages. The reason for this is that a variation of only one register setup suffices for the language switching.

The above and other objects, features, and advantages of the present invention will become apparent from the following description with reference to the accompanying drawings, which illustrate examples of the present invention.

DETAILED DESCRIPTION OF THE PREFERRED EMBODIMENT

Figure 1:
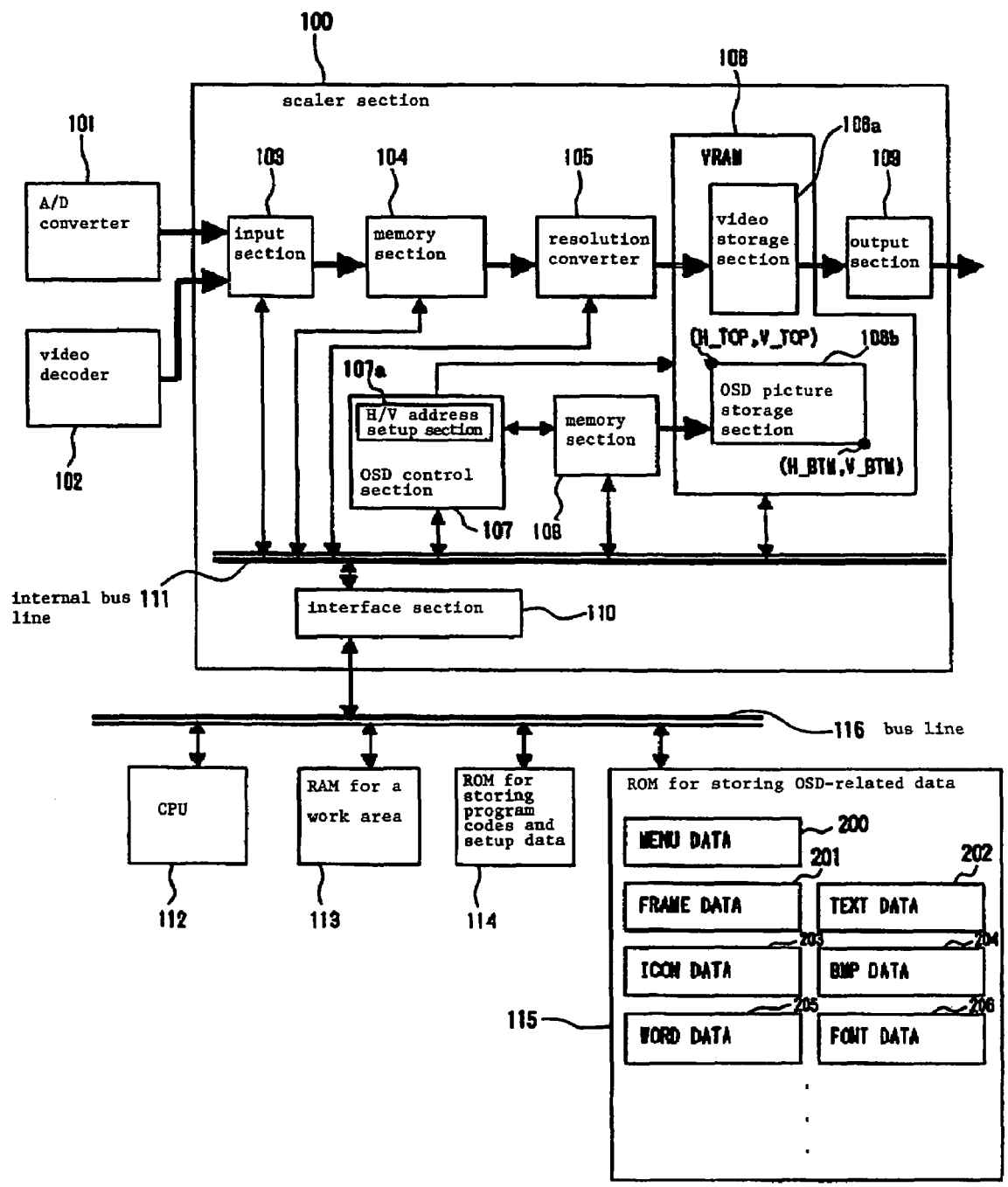
FIG. 1 is a block diagram showing the configuration for performing the functions of the resolution conversion and OSD picture synthesis processing of a conventional device for displaying an image.
Figure 2:
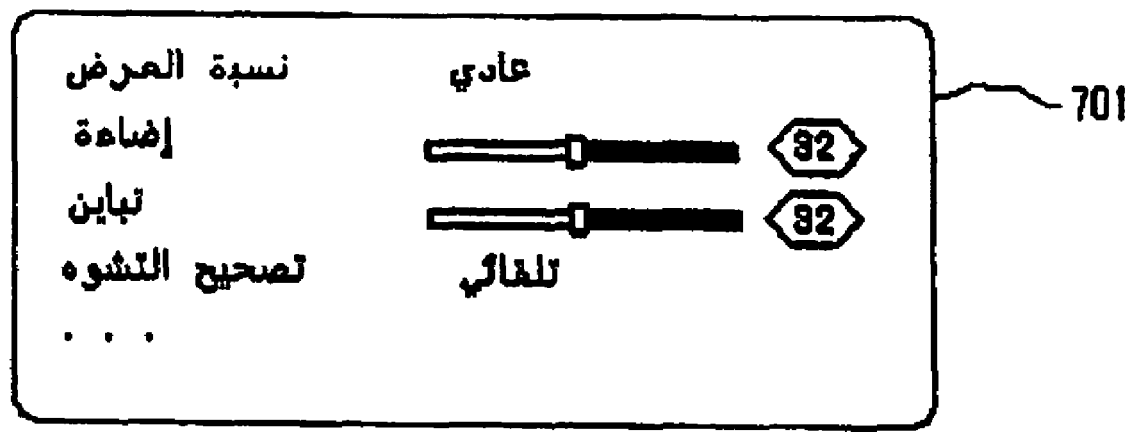
FIG. 2 is a diagram representing an on-screen image of the setup menu of a conventional device for displaying an image.
Figure 3:
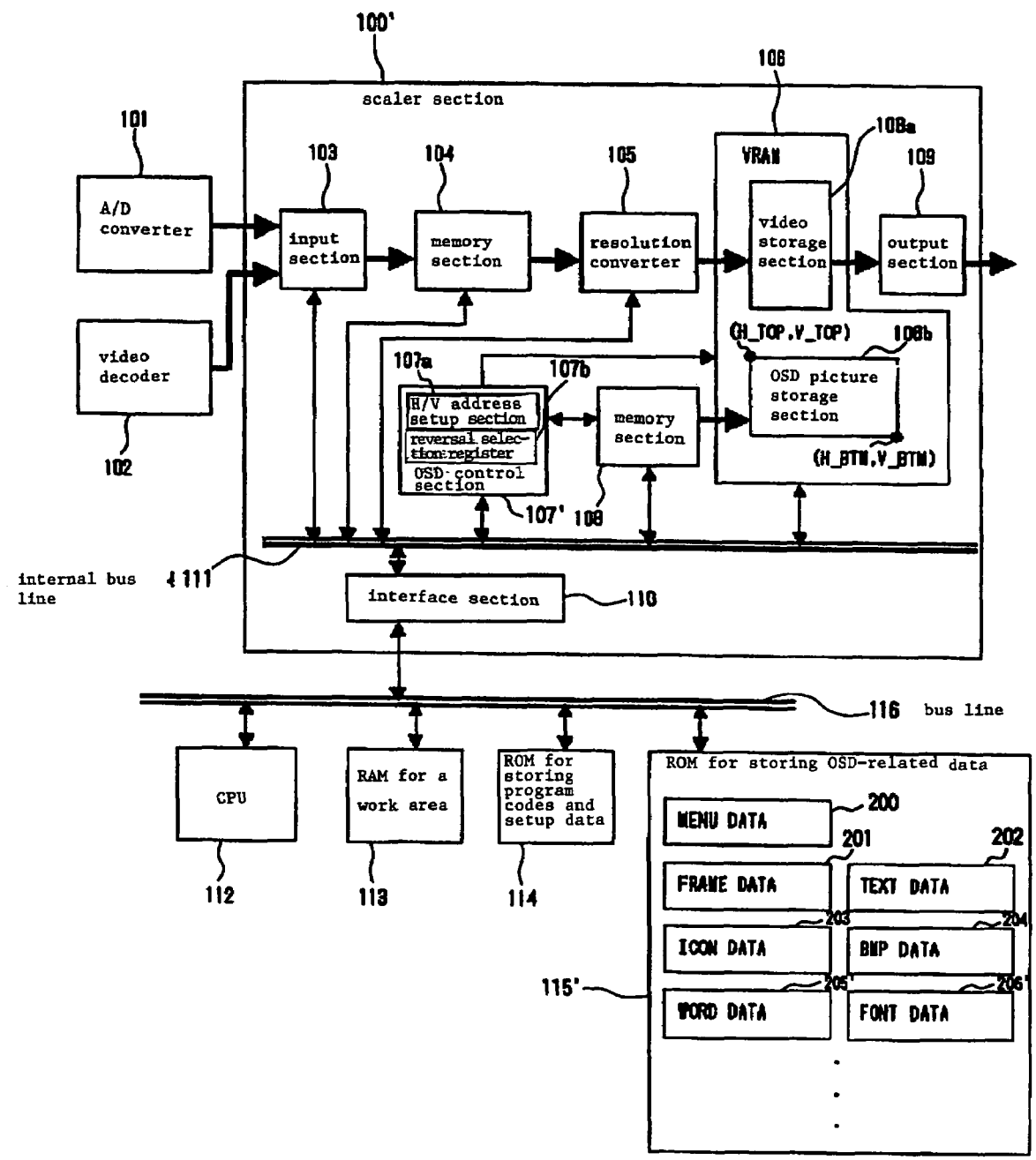
FIG. 3 is a block diagram of an embodiment according to the present invention showing the configuration for performing the functions of the resolution conversion and OSD picture synthesis processing of a device for displaying an image.

FIG. 3 is a block diagram illustrating a structure adapted for performing the resolution conversion and OSD picture synthesis processing functions in an embodiment of an image display device according to the present invention. The structure has: scaler section 100' that performs the process to effect resolution conversion on a video signal and also to effect OSD picture synthesis processing of the video signal; A/D converter 101 that takes samples of analog RGB signals of the computer and converts the sampled signals into digital signals; video decoder 102 that samples video signals and converts the sampled signals into digital signals; CPU 112 that controls scaler section 100', A/D converter 101, video decoder 102, and other peripheral circuits; RAM for work area 113 of CPU 112; ROM 114 for storing the program codes and setup data of CPU 112; ROM for storing OSD-related data 115'; and bus line 116 that connects CPU 112 and the peripheral blocks.

Scaler section 100 has: input section 103 that selects the video signals of A/D converter 101 and video decoder 102; memory section 104 that stores the video signals selected by input section 103; resolution conversion section 105 that performs resolution conversion of the video signals stored in memory section 104; VRAM 106 in which the resolution-converted video signals are deployed; OSD control section 107' that controls OSD pictures to be displayed on a screen; memory section 108 that serves as a work area for creating OSD pictures; output section 109 that supplies video signals stored in VRAM 106; internal bus line 111 that connects the blocks within scaler section 100; and interface section 110 that controls the communication between bus line 116 and internal bus line 111.

VRAM 106 has video storage section 106a that stores video signals and OSD picture storage section 106b that stores OSD pictures.

OSD control section 107' is provided with H/V address setup section 107a that sets the addresses of OSD picture storage section 106b and reversal selection register 107b that selects whether to reverse an OSD picture in memory section 108 left to right.

Figure 4:
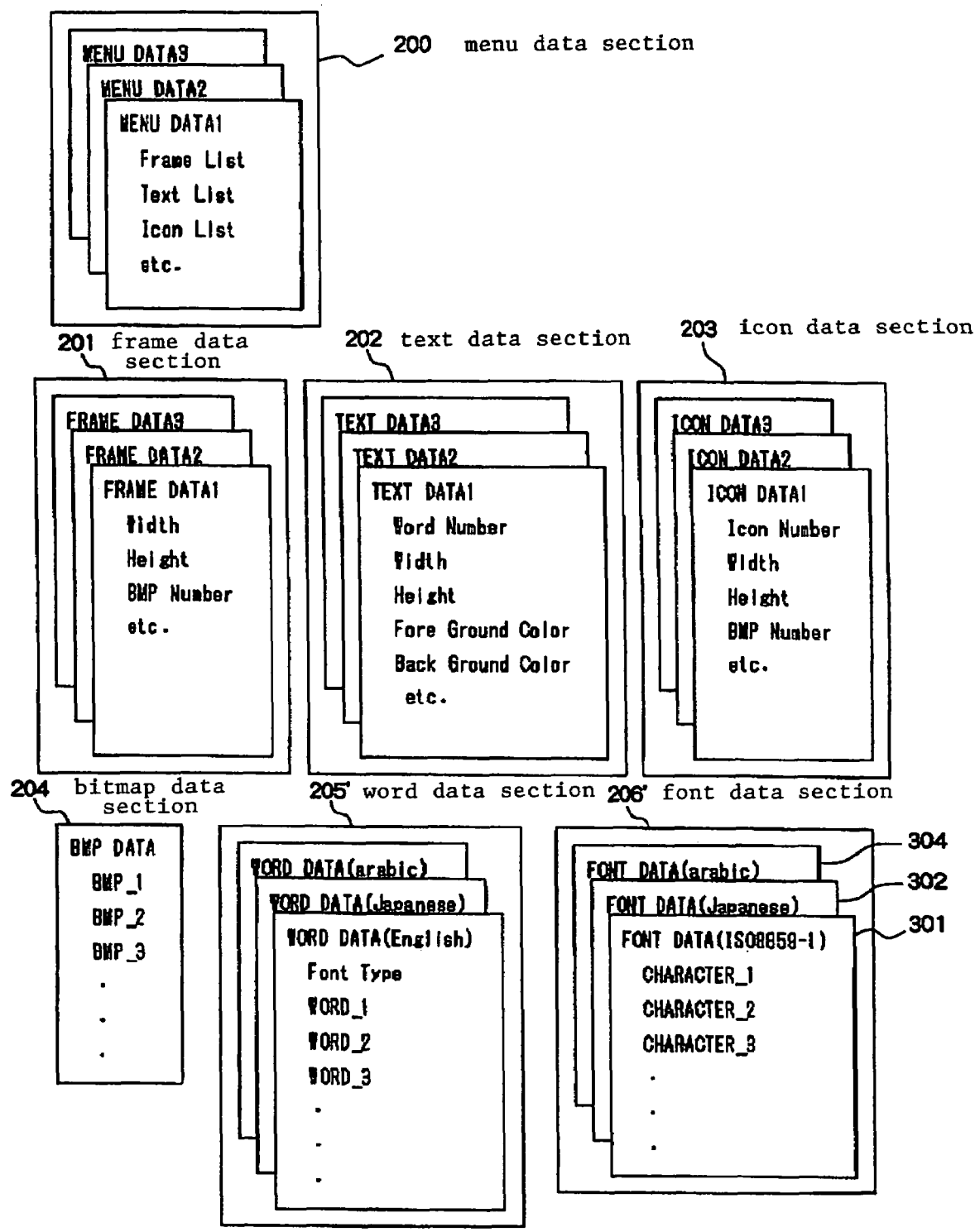
FIG. 4 is a diagram illustrating a data structure of the data stored in ROM for storing the OSD-related data.

Explanation is given regarding the data structure of the data stored in ROM which stores the OSD-related data 115' referring to FIG. 4.

Reference number 200 is assigned to the menu data section for storing component information for each menu page. Reference number 201 denotes the frame data section for storing frame data which are components that constitute the menu. Reference number 202 denotes a text data section for storing text data which are components that constitute the menu. Reference number 203 denotes an icon data section for storing icon data, which are components that constitute the menu. Reference number 204 denotes a bitmap data section for storing bitmap data which are components that constitute the menu. Reference number 205' denotes a word data section for storing single-word data to be displayed in each menu page. Reference number 206' denotes a font data section for storing font data for each language set.

Figure 5:
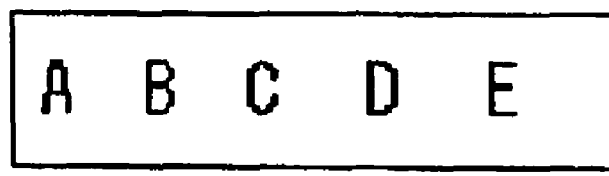
FIG. 5 is a diagram illustrating the font data of character sets for individual languages stored in the font data section.
Figure 5:
Figure 5:
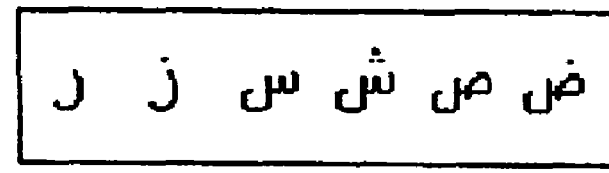
Figure 5:
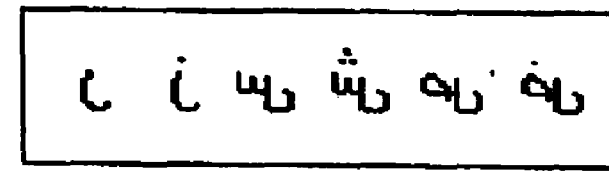

Explanation is presented referring to FIG. 5 regarding the font data of each language set stored in font data section 206'.

Reference number 301 represents an example of a bitmap font of language set ISO-8859-1 font. Reference number 302 represents an example of a Japanese bitmap font. Reference number 303 represents an example of an Arabic bitmap font before reversing left to right. Reference number 304 represents an example of a bitmap font after each font in Arabic bitmap font 303 has been reversed left-to-right.

Font data section 206' has the font of the language that is to be written from left to right in the ordinary style without reversing left to right and has the font of the language to be written from right to left in the style such that the ordinary font is reversed left to right. For example, font data section 206' has bitmap 301 of the language set ISO-8859-1 font, bitmap 302 of Japanese font and left-to-right reversed bitmap 304 of the Arabic font.

Explanation is given with reference to FIG. 3 regarding the video signal processing operation of an embodiment of the image display device according to the present invention.

First, input section 103 selects the video signals supplied from any of A/D converter 101 and video decoder 102. The video signal selected at input section 103 is temporarily stored in memory section 104. The video signal stored in memory section 104 is subject to resolution conversion processing to coordinate with the resolution of the display device (not shown) at resolution conversion section 105. The video signal resolution-converted at resolution conversion section 105 is stored in video storage section 106a in VRAM 106. The video signal stored in video storage section 106a is finally superimposed on the OSD picture that has been created through the process to be hereinafter described and stored in OSD picture storage section 106b and the superimposed video signal is supplied as an output.

Figure 6:
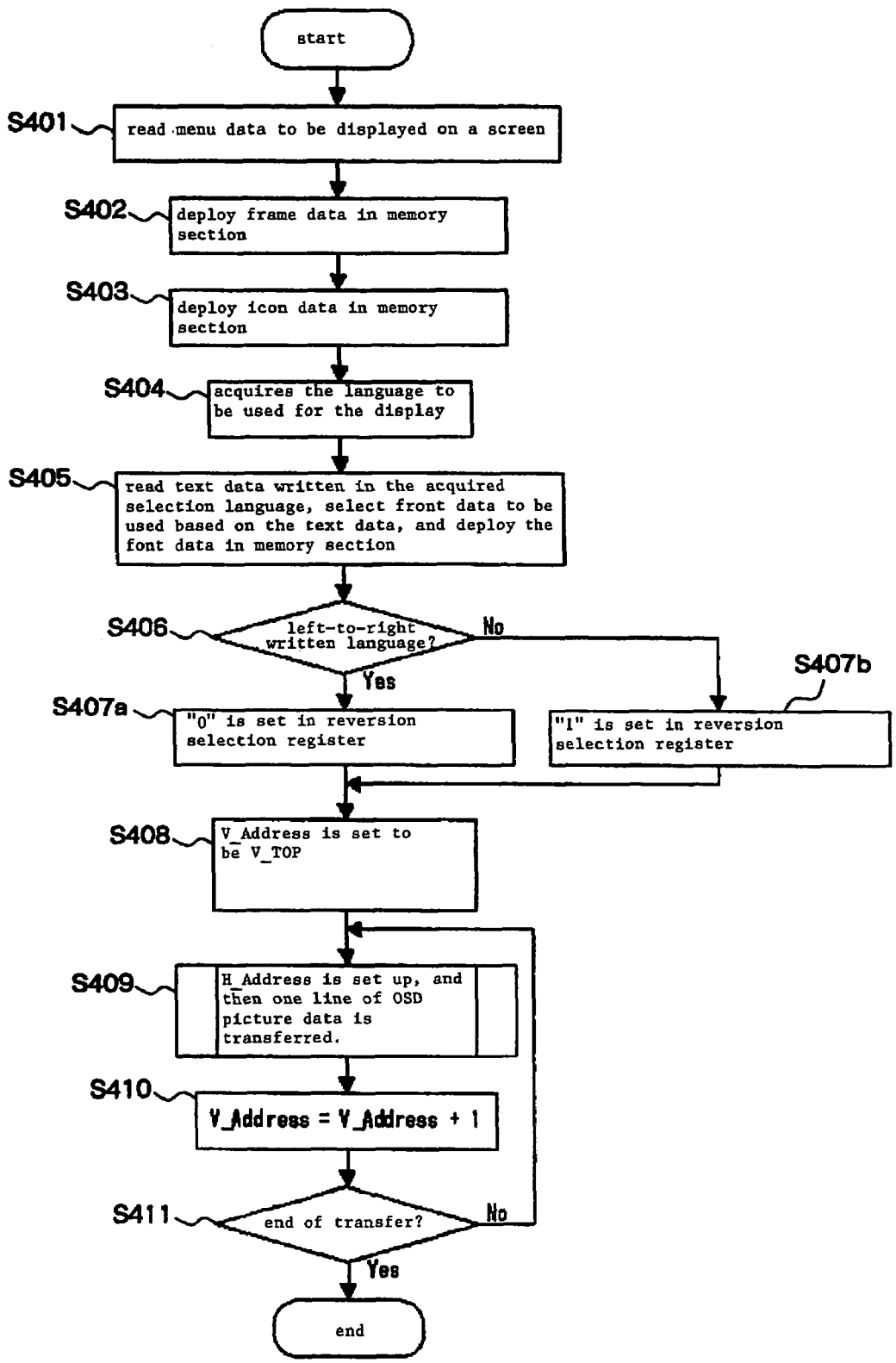
FIG. 6 is a flow chart of an embodiment according to the present invention illustrating the procedures of the OSD picture process in the device for displaying an image.
Figure 7:
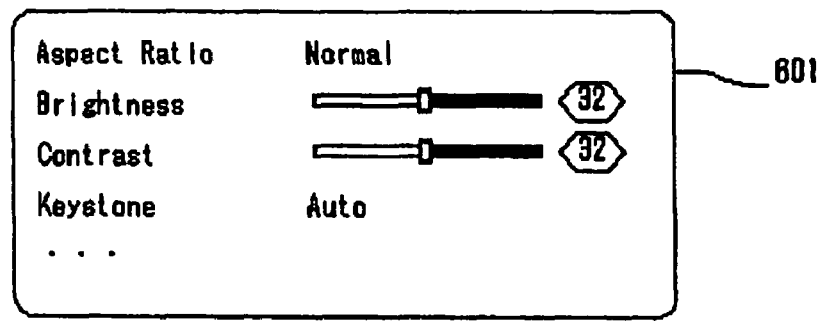
FIG. 7 is a diagram representing an on-screen image of a setup menu.
Figure 7:
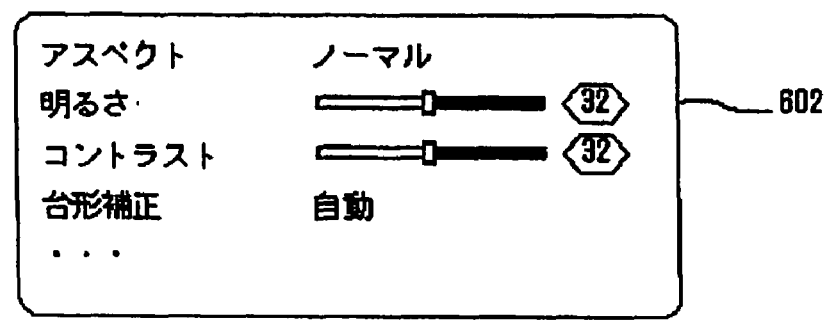
Figure 7:
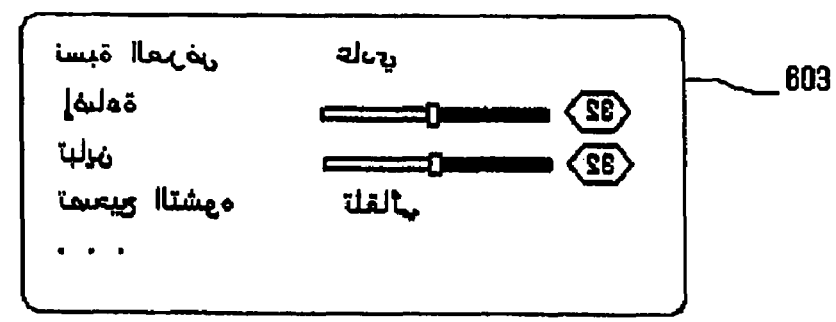
Figure 7:
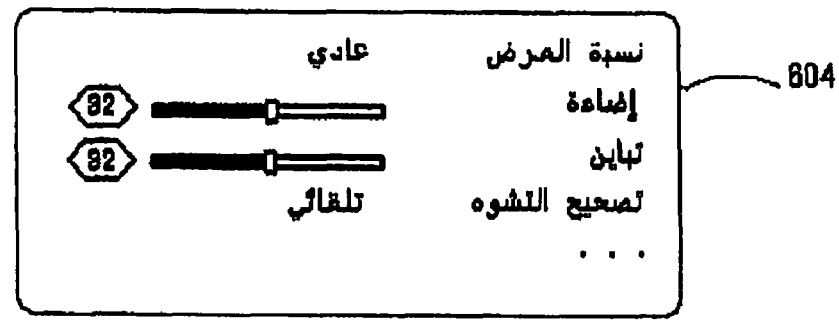
Figure 8:
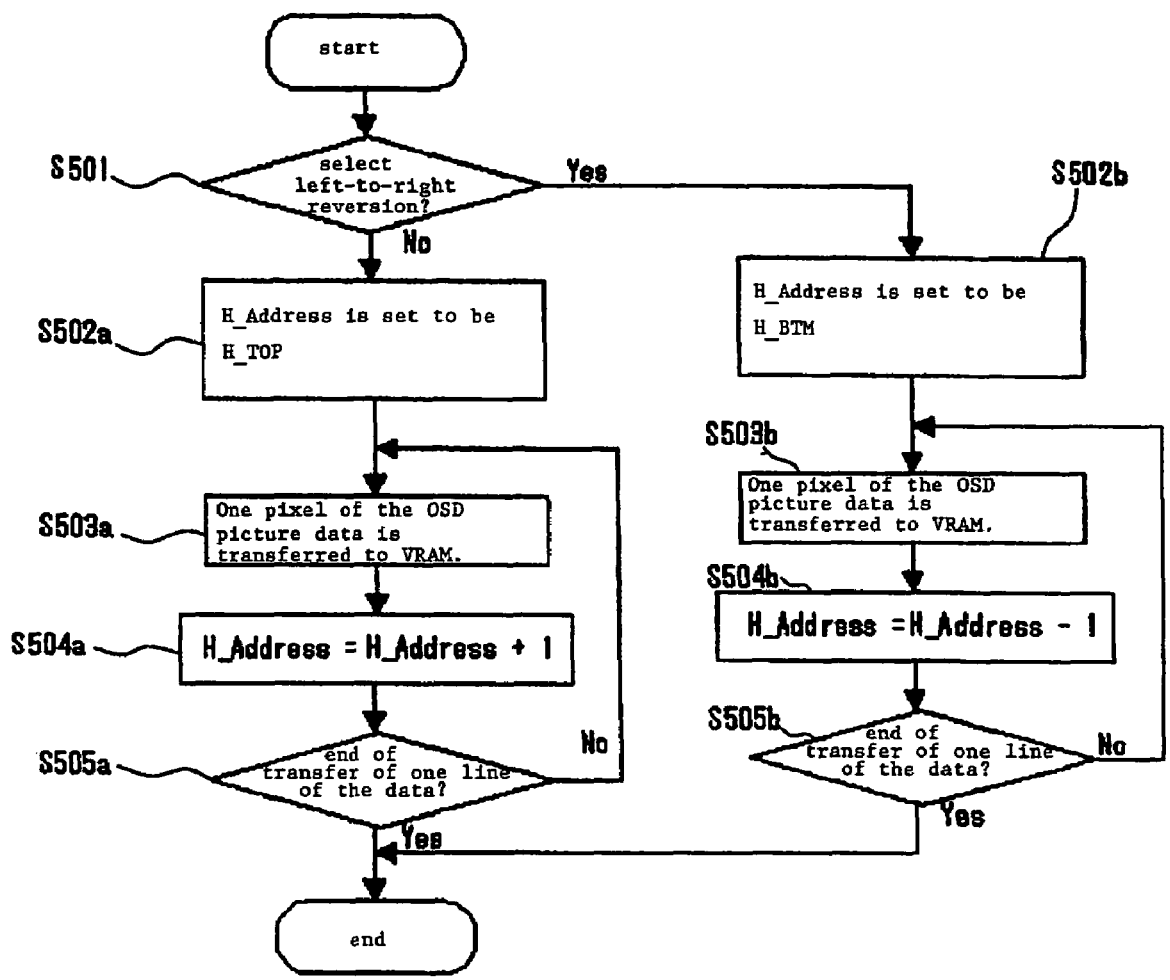
FIG. 8 is a flow chart illustrating the procedures of S 409 in FIG. 6.

Explanation next is given regarding the operations for the OSD-picture processing referring to the flow charts represented in FIGS. 6 and 8 and to FIG. 7.

First, CPU 112 reads menu data, which are component data of the setup menu to be displayed on a screen from ROM for storing the OSD-related data 115' and develops the read data in RAM for work area 113 (Step S401). CPU 112 next reads frame data from ROM for storing OSD-related data 115' according to the menu data deployed in RAM for work area 113 and deploys the read data, as OSD picture data, in memory section 108 through bus line 116 and interface section 110 (Step S 402). Likewise, CPU 112 reads icon data from ROM for storing the OSD-related data 115' according to the menu data deployed in RAM for work area 113 and deploys the read data, as OSD picture data, in memory section 108 through bus line 116 and interface section 110 (Step S 403).

CPU 112 next acquires the current selection language to be used for display from ROM 114 or RAM for a work area 113 (Step S 404). CPU 112 reads the text data written in the acquired selection language from ROM for storing the OSD-related data 115', selects a font to be used based on the text data, reads word data and font data from ROM for storing the OSD-related data 115', and deploys the read data as OSD picture data in memory section 108 through bus line 116 and interface 110 (Step S 405).

At this time point, the screen image of the setup menu deployed in memory 108 is as shown in FIG. 7. Reference number 601 represents a screen image of the setup menu when the display language is English. Reference number 602 represents a screen image of the setup menu when the display language is Japanese. Reference number 603 represents a screen image of the setup menu when the display language is Arabic. Since the font data of Arabic is reversed left to right, the text portion is of a left-to-right reversed image.

Next, a decision is made whether or not the current selection language is a right-to-left written language, i.e., whether or not the current selection language is a language reversed left to right (Step S 406). The criterion information is stored in word data section 205'. Next, whether or not the left-to-right reversion is to be made is set in reversion selection register 107b. If the left-to-right reversion is unnecessary for the language of interest, then "0: not reversed" is set in reversion selection register 107b (Step S407a), and if the left-to-right reversion is necessary for the language of interest, then "1: reversed" is set in reversion selection register 107b (Step S407b).

Explanation next regards the operation of deploying in VRAM 106 the OSD pictures that are stored in memory section 108. OSD control section 107' sets up a vertical start address of OSD picture storage section 106b to which the OSD picture data stored in memory section 108 are to be transferred (Step S408). Specifically, let (H_Address, V_Address) denote an arbitrary address in OSD picture storage section 106b, (H_TOP, V_TOP) denote the upper left end address of OSD picture storage section 106b, and (H_BTM, V_BTM) denote the lower right end address of OSD picture storage section 106b. Then, V_Address of the vertical address is set to be V_TOP (Step S408). Next, the horizontal start address of OSD picture storage section 106b, to which the OSD picture data are transferred, is set up, and then one line of the picture data is transferred (Step S409).

Explanation is given regarding the procedures effected in Step S409 referring to the flow chart in FIG. 8. OSD control section 107' selects whether or not the left-to-right reversion is invoked according to the setup value of reversion selection register 107b (Step S501). Next, the horizontal start address of OSD picture storage section 106b, to which the OSD picture data stored in memory section 108 are transferred, is set up (Step S502a, Step S502b). Specifically, in the case where a left-to-right reversed display is not intended, the H_Top is set for the horizontal address, H_Address (Step S502a), and in the case where a left-to-right reversed display is intended, the H_BTM is set for the horizontal address, H_Address (Step S502b). Next, one pixel of the OSD picture data stored in memory section 108 is transferred to the set address of OSD picture storage section 106b (Step S503a, Step S503b). Next, the horizontal address of OSD picture storage section 106b is incremented by +1 or −1 (Step S504a, S504b). Next, it is confirmed whether or not the incremented address of OSD picture storage section 106b is outside the OSD region in order to decide the end of transfer of one line of the data (Step S505a, Step S505b). If the transfer of one line of the data has not ended, the process returns to the step for transferring the picture data (Step S 503a, Step S 503b), and the steps (Step S 504a, Step S 504b) and (Step S505a, Step S505b) are repeated. This process is repeated until the transfer of one line of the picture data ends.

Next, the vertical address of OSD picture storage section 106b is incremented by +1 (Step S410). Next, it is confirmed whether or not the vertical address of OSD picture storage section 106b is outside the OSD region in order to decide the end of transfer of all the lines of picture data (Step S411). If the transfer of all the lines of the picture data has not ended, the horizontal start address of OSD picture storage section 106b is set and the process returns to the step (Step S409) for transferring one line of picture data and repeats Step S 410 and Step S 411. When transfer of all the lines of picture data ends, the OSD picture process ends.

As depicted in FIG. 7, when the display language is English or Japanese, a text is written from left to right, and thus reversion selection register 107b is set to be "not left-to-right reversed." In this case, the screen image of the setup menu deployed in OSD picture storage section 106b of VRAM 106 is represented as reference numbers 601 and 602. When the display language is Arabic, on the other hand, the text is written from right to left. Accordingly, reversion selection register 107b is set to be "left-to-right reversed," and the screen image of the setup menu deployed in OSD picture storage section 106b of VRAM 106 becomes a screen image of the setup menu reversed left to right as represented by reference numbers 604.

In a screen image of the setup menu 604, the setup item name is arranged on the right of the screen and setup values and adjustment bars are represented on the left side of the item names with text portions written in a flush right representation, and thus the screen image is displayed in a desirable on-screen configuration as a setup menu of the language to be written in right-to-left style.

In addition, it is feasible to execute the method for displaying an image on a computer or a microprocessor by means of a program of the method described in the above-described embodiment of the present invention Furthermore, it is possible to make a computer or a microprocessor operate as an image display device through the use of the program of the image display device involved in the above-described embodiment of the present invention.

While a preferred embodiment of the present invention has been described using specific terms, such description is for illustrative purposes only, and it is to be understood that changes and variations may be made without departing from the spirit or scope of the following claims.

What is claimed is:

1. A method of displaying an image on an on-screen display (OSD) comprising the steps of:
    storing a font of a language to be written from left to right in ROM for storing OSD-related data in an ordinary style in which the font is not reversed left to right, and storing a font of a language to be written from right to left in ROM for storing the OSD-related data in a style in which each ordinary font is reversed left to right,
    reading component data of a setup menu to be displayed on a screen, from said ROM for storing the OSD-related data and deploying the read data on RAM for a work area,
    reading frame data and icon data from said ROM for storing the OSD-related data according to said menu data deployed in said RAM for a work area, and deploying the read data in a memory section as OSD picture data,
    acquiring a selection language, which is a language to be displayed,
    reading text data of the acquired selection language from said ROM for storing the OSD-related data, selecting the font to be used from said text data, reading word data and font data from said ROM for storing the OSD-related data and deploying the read data in said memory section as said OSD picture data,
    deciding whether or not said selection language is a language to be written from right to left,
    if said selection language is a language to be written from right to left, then setting up information indicating reversion in a reversion selection register for selecting whether to reverse an OSD picture left to right, and if said selection language is a language to be written from left to right, then setting up information indicating no reversion in a reversion selection register, and
    if a setup value of said reversion selection register is the information indicating reversion, then reversing left to right said OSD picture stored in said memory section and transferring the reversed picture to VRAM.

2. A method of displaying an image on an OSD according to claim 1, wherein the step of said reversing left to right said OSD picture and transferring the reversed picture to VRAM comprises the steps of:
    setting up a vertical start address in an OSD picture storage section, to which OSD picture data stored in said memory section are to be transferred, under control of an OSD control section;
    selecting whether to reverse left to right in accordance with a setup value of said reversion selection register by operation of said OSD control section;
    setting up a horizontal start address in the OSD picture storage section based on the setup value of said reversion selection register;
    transferring one pixel of said OSD picture data stored in said memory section into the address of said OSD picture storage section;
    incrementing or decrementing the horizontal address of said OSD picture storage section by 1 based on the setup value of said reversion selection register; and
    confirming whether or not the horizontal address of said OSD picture storage section is outside an OSD region and deciding whether or not a transfer of one line of data has ended; and
    if the transfer of one line of data has not ended, a process returns to the step of said transferring one pixel of said OSD picture data and repeats the subsequent steps until the transfer of one line of data ends,
    if the transfer of one line of data has ended, the process executes the steps of:
    incrementing the vertical address in said OSD picture storage section by 1, and
    confirming whether or not the vertical address in said OSD picture storage section is outside an OSD region and deciding whether or not the transfer of all the lines of data has ended; and
    if the transfer of all the lines of data has not ended, the process returns to the step of selecting whether to reverse left to right and repeats the subsequent steps until the transfer of all the lines of data ends.

3. A computer readable medium encoded with a computer program for operating a computer or a microprocessor to enable implementing the method of displaying an image as claimed in claim 1.

4. A computer readable medium encoded with a computer program for operating a computer or a microprocessor to enable implementing the method of displaying an image as claimed in claim 2.

5. A device for displaying an image on an on-screen display (OSD), comprising:
    a means for reading component data of a setup menu to be displayed on a screen from ROM for storing OSD-related data and deploying the read data in RAM for a work area,
    a means for reading frame data and icon data from said ROM for storing the OSD-related data according to said menu data deployed in said RAM for a work area, and deploying the read data in a memory section as OSD picture data,
    a means for acquiring a selection language, which is a language to be displayed, and
    a means for reading text data of the acquired selection language from said ROM for storing the OSD-related data, selecting a font to be used from said text data, reading word data and font data from said ROM for storing the OSD-related data, and deploying the read word and font data in said memory section as said OSD picture data, wherein said font has an ordinary form that is not left-to-right reversed in the font of a language to be written from left to right, and has a form that is created by reversing the ordinary font left-to-right in the font of a language to be written from right to left,
    a means for deciding whether or not the selection language is a language to be written from right to left,
    a means for setting up information indicating reversion in a reversion selection register for selecting whether to reverse an OSD picture left-to-right if said selection language is a language to be written from right to left, and setting up an information indicating no reversion in a reversion selection register if said selection language is a language to be written from left to right, and
    a means for reversing left to right said OSD picture stored in said memory section and transferring the reversed picture to VRAM if a setup value of said reversion selection register represents the information indicating reversion.

6. A device for displaying an image on an OSD according to claim 5, wherein said means for reversing said OSD picture left-to-right and transferring the reversed picture to VRAM comprises:

- a means for setting up a vertical start address in an OSD picture storage section, to which an OSD picture data stored in said memory section are to be transferred, under a control of an OSD control section;
- a means for deciding whether to reverse left to right in accordance with a setup value of said reversion selection register by an operation of said OSD control section;
- a means for setting up a horizontal start address in the OSD picture storage section based on the setup value of said reversion selection register;
- a means for transferring one pixel of said OSD picture data stored in said memory section into the address of said OSD picture storage section;
- a means for setting the horizontal address of said OSD picture storage section an incremented or decremented value by 1 based on the setup value of said reversion selection register;
- a means for confirming whether or not the horizontal address of said OSD picture storage section is outside the OSD region and deciding whether or not a transfer of one line of data has ended;
- a means for repeatedly operating a means for transferring one pixel of said OSD picture data, a means for setting an incremented or decremented value by 1 and a means for deciding whether or not the transfer of one line of data has ended until the transfer of one line of the data ends, if the transfer of one line of data has not ended;
- a means for setting the vertical address of said OSD picture storage section an incremented or decremented value by 1 if the transfer of one line of data has ended;
- a means for confirming whether or not the vertical address in said OSD picture storage section is outside an OSD region and deciding whether or not the transfer of all lines of the data has ended; and
- a means for repeatedly operating all of the above-described means except said means for setting up a vertical start address until the transfer of all the lines of data ends, if the transfer of all the lines of data has not ended.

7. A computer readable medium encoded with a computer program for operating a computer or a microprocessor to enable functioning as a device for displaying an image as claimed in claim 5.

8. A computer readable medium encoded with a computer program for operating a computer or a microprocessor to enable functioning as a device for displaying an image as claimed in claim 6.

* * * * *